2,889,115
Patented June 2, 1959

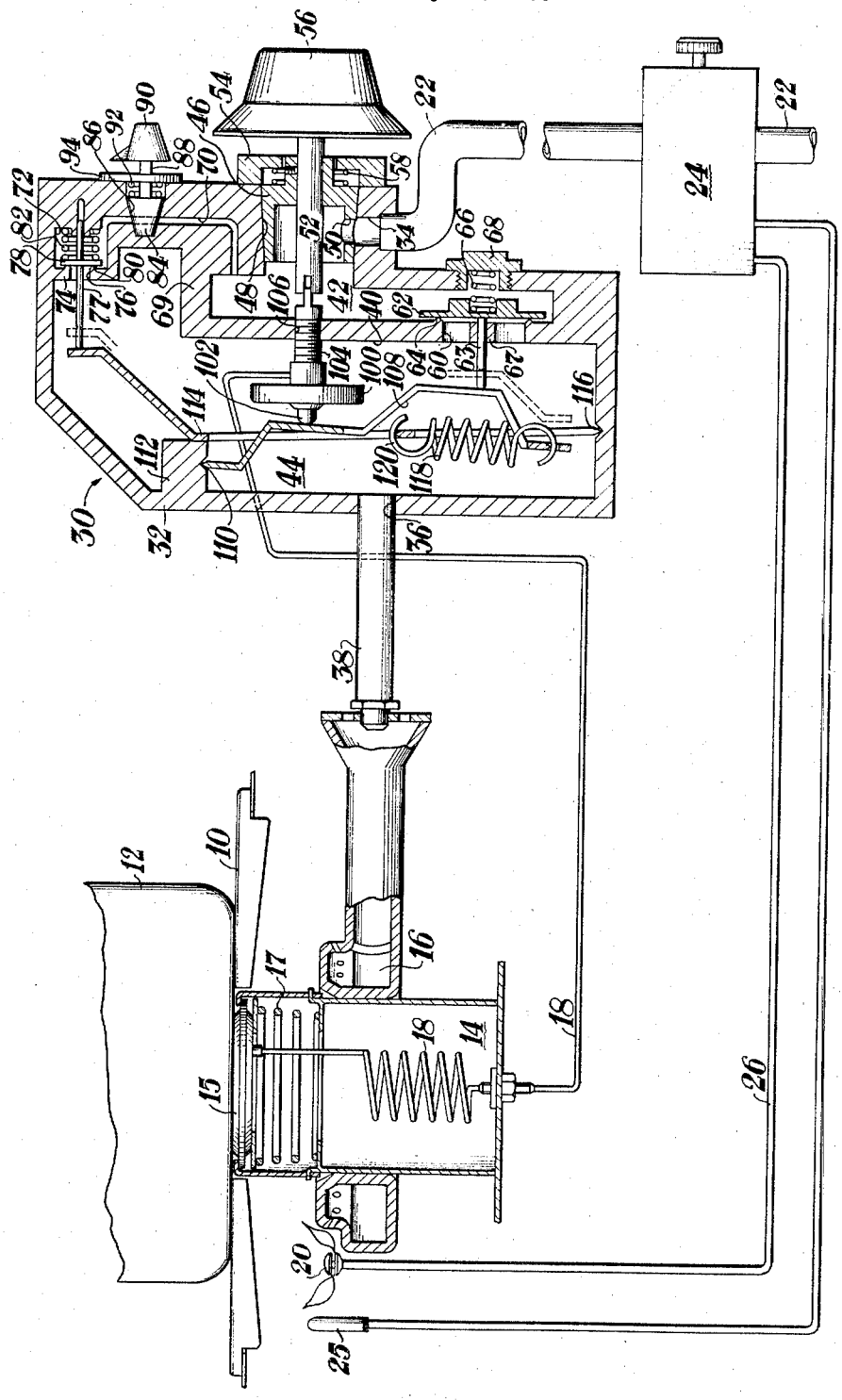

2,889,115

TEMPERATURE CONTROL FOR COOKING APPLIANCES

Victor Weber, Greensburg, Pa., assignor to Robertshaw-Fulton Controls Company, Greensburg, Pa., a corporation of Delaware Application May 19, 1955, Serial No. 509,511

1 Claim. (Cl. 236—48)

This invention relates to an improved control mechanism for regulating the heat output of a heating element, and more particularly, a surface heating element of a gas range.

It is a principal object of this invention to automatically regulate the heat output of the surface heating element to maintain a cooking vessel, supported thereon, at a desired temperature.

Many foods require rapid initial heating to bring the food to a predetermined temperature and thereafter require a reduced amount of heat input to maintain such predetermined temperature. It is an object of this invention to effect such cooking operation by permitting the heating element to operate at full energy input until the temperature of the food to be cooked reaches a predetermined value, and then reducing the energy input to the heating element to maintain the food at the proper temperature.

In accordance with the present invention, a control mechanism is provided which will thermostatically regulate the contents of a cooking vessel when placed on a surface burner of a gas range or similar class and purpose gas appliance, by limiting the cooking vessel temperature through control of gas flow to the associated burner.

In a preferred embodiment, a dual valve unit having tandem or parallel gas feeds is provided for supplying fuel to the surface burner. The two feeds are so arranged as to provide full or maximum heating rate as soon as the burner is turned "on" and a temperature setting of the control is made. Mechanism is also provided for thermostatically closing one of the valves as the cooking vessel approaches a selected temperature or control setting, thus reducing the supply of fuel to the burner. Upon obtaining the desired cooking temperature, the thermostatically operated mechanism closes a second valve for terminating fuel flow to the burner. Thereafter, one or both of the valves are thermostatically actuated between open and closed positions to maintain the cooking vessel at the desired temperature.

Other objects and advantages will become apparent from the following description taken in connection with the accompanying drawing which is a schematic view of a control system for a fuel burner embodying this invention, portions thereof being shown in section.

Referring more particularly to the drawing, there is shown an annular surface heating grate or spider 10 which is adapted to be supported on the top plate of a gas range (not shown) in a manner well known in the art. The grate or spider 10 is adapted to support a cooking vessel 12 thereon and is provided with a temperature sensing element 14 which is located centrally thereof. Disposed beneath the grate 10 and encircling the sensing element 14 is a gas burner 16 which may be supported on the gas range by any suitable means. It will be understood that the grate 10 may be replaced by or be interchangeable with a griddle, the temperature of which may be similarly sensed by the element 14.

The sensing element 14 takes the form of a cylindrical container for housing a temperature sensing bulb 15 which communicates with the capillary tube 18 and is biased toward the cooking vessel 12 by a suitable coil spring 17.

The main burner 16 is provided with a pilot burner 20 located in lighting proximity thereto. The flow of fuel is conducted to the burner 16 by a main fuel pipe under control of an automatic pilot control 24 to which a conduit 26 for supplying fuel to the pilot burner 20 is connected. The automatic pilot control 24 may be of any conventional construction, but preferably of the type including a thermocouple 25 located adjacent the pilot burner 20, for preventing the flow of fuel to the burner 16 when a flame does not exist at the pilot burner 20.

Interposed between the automatic pilot control device 24 and the surface burner 16 is a dual valve assembly generally indicated by the reference numeral 30 and comprising a valve housing 32 having an inlet opening 34 and an outlet opening 36. The inlet opening 34 is adapted to receive the end of the conduit 22 and the outlet 36 is adapted to receive the end of a conduit 38 leading to the surface burner 16. The interior of the housing 32 is provided with a longitudinally extending partition wall 40 which separates an inlet chamber 42, in communication with the inlet 34, and an outlet chamber 44, in communication with the outlet 36.

The flow of fuel into the chamber 42 from the conduit 22 is under control of a tapered valve member or cock 46 which is adapted to rotate in a tapered opening 48 formed in the casing 32. The valve member 46 is hollow and is provided with a port 50 in its side wall adapted to register with the inlet opening 34. Rotation of the valve member 46 is effected by the provision of a stem 52 which projects from the larger end of the valve member 46 into an end casing or cover 54 secured to the main casing 32. A dial or knob 56 is mounted exteriorly of the cover 54 on the stem 52 as shown in the drawing.

A coil spring 58 held in compression between the interior surface of the cover 54 and the enlarged end of the valve member 46 serves to bias the valve member 46 snugly in the opening 48 in the usual manner.

The partition wall 40 is provided with an opening 60 which connects the inlet chamber 42 with the outlet chamber 44. The flow of fuel through the opening 60 is controlled by a main valve member 62 which is adapted to engage a seat 64 formed in a surface of the wall 40. A valve actuating pin 63, slidable within an apertured plate 67 disposed within the opening 60, is secured to the valve member 62 for a purpose to be discussed hereinafter. The valve member 62 is biased to a closing position on the valve seat 64 and the pin 63 forced to the left, by a coil spring 66 operatively disposed between a surface of the valve member remote from the opening 60 and the internal surface of an adjusting nut 68 secured to the casing 32.

As shown in the drawing, a wall 69 of the casing 32 is formed with a passage 70 which connects the inlet chamber 42 with a snap-action valve chamber 72 also formed in the wall 69. A wall 74 extending inwardly of the casing 32 separates the valve chamber 72 from the outlet chamber 44 and is provided with an opening 76 which serves to connect the chambers 44 and 72. The flow of fuel through the opening 76 is controlled by a snap-action valve member 78 which is engageable with a seat 80 formed in one surface of the wall 74. An actuating pin 77 is secured to the valve member to be movable therewith during actuation of the valve member between open and closed positions for a purpose to be discussed hereinafter. A coil spring 82 is interposed between one surface of the valve member 78 and an interior wall of the casing 72 and serves to bias the valve member 78 upon the seat 80 and to force the pin 77 to the left.

The fuel supply from the inlet chamber 42 to the snap-action valve chamber is controlled by a valve member 84 operable in the passage 70. The valve member 84 may take any suitable form, but is shown here as a gas cock which is adapted to cooperate with a tapered opening 86. The valve member 84 also includes a stem 88 projecting outwardly of the casing 72 and an adjusting knob 90 secured to the projecting end of the stem 88. A coil spring 92 is held in compression between the top surface of the valve member 84 and the inner surface of a cover 94 secured to the casing 72 by any suitable means. It will be apparent that the flow of fuel through the passageway 70 may be controlled by the manual manipulation of the knob 90 to effect alignment of the passage 70 and a port 96 formed in the valve member 84.

The structure so far presented involves a dual valve arrangement for controlling the flow of fuel from the inlet chamber 42 to the outlet chamber 44. This invention contemplates the provision of mechanism for thermostatically actuating the valve members 62 and 78.

To this end, the capillary tube 18 communicates with an expansible power element 100 positioned within the outlet chamber 44 of the casing 32 and may consist of a pair of flexible diaphragms welded together at their periphery and carrying a thrust button 102 on one side thereof. The other side of the power element 100 is secured to a stud 104 which is threaded through a suitable aperture 106 formed in the wall 40 to serve as an adjustable mount for the power element 100. One end of the stud 104 projects into the inlet chamber 42 to be attached to one end of the stem 52 so as to be manipulated by rotation of the stem 52 and the knob 56. As will be apparent, axial adjustment of the power element 100 is caused by the rotation of the knob 56 in the usual temperature setting manner.

The assembly of the bulb 15, the capillary tube 18 and the expansible power element 100 is filled with a suitable thermal fluid which will expand upon increase in temperature sensed by the bulb 15 to effect expansion of the power element 100.

Disposed within the chamber 44 is a snap-action device of the conventional type comprising a main lever 108 fulcrumed at 110 on an abutment 112 extending inwardly from one wall of the casing 32 and a secondary lever 114 which is bifurcated at its lower end and fulcrumed at 116 to another wall of the casing 32. A spring 118 is extended between lower end of the main lever 108 and a bridge 120 formed intermediate of the ends of the secondary lever 114 to hold the levers 108 and 114 against their respective fulcrums 110, 116.

As the liquid in the bulb 15 positioned in the sensing element 14 and the capillary tube 18 expands in response to temperatures prevailing at the utensil 12, the expansible element 100 will also expand and slowly rotate the main acuating lever 108 in a clockwise direction. Due to the tension of the spring 118, the auxiliary lever 114 will rotate in a counterclockwise direction with a snap action as the actuating lever 108 moves over center past the line between the fulcrums 110 and 116.

As previously stated, the pin 63 is secured to the valve member 62 to be movable therewith and the force exerted by the spring 66 is sufficient to position the pin 63 in engagement with the lever 108 for certain predetermined positions of the same. Similarly, the pin 77 is biased into engagement with the upper end of the lever 114 for actuating the valve member 78 between open and closed positions.

Operation

As shown, the apparatus is in the "off" position with the valve members 62 and 78 on their respective seats and no fuel being supplied to the surface burner 16. However, fuel is being supplied to the pilot burner 20 by way of the conduit 26 and the automatic valve 24 permits fuel to flow through the conduit 22 as far as the shut-off cock 46. To place the apparatus in operation, the shut-off cock 46 is turned to the "on" position and to a desired temperature setting. Rotation of the knob 56 of the shut-off cock 46 will serve to rotate the stud 104 and move the power element 100 to the right as viewed in the drawing, thereby permitting the main actuating lever 108 to rotate counterclockwise about its pivot 110. Rotation of the lever 108 from the full line position to the dotted line position will cause the same to contact and move the pin 63 to the right and unseat the valve member 62 against the bias of the spring 66. Similarly, the movement of the lever 108 will cause the clockwise rotation of the lever 114 from full line position to the dotted line position. This action of the lever 114 will actuate the pin 77 to the right to unseat the valve member 78.

With the snap-action mechanism in this position, and the valve members 62, 78 in their open position, there are provided parallel fuel paths for the flow of fuel to the chamber 44 and the burner 16. The first fuel path may be traced as follows: From inlet 34, inlet chamber 42, through passageway 70, into the chamber 72, through the opening 76 and into the outlet chamber 44. A second fuel path may be traced as follows: From the inlet 34 into the chamber 42, through the opening 60 and into the outlet chamber 44.

The fuel present at the surface burner 16 is ignited by the pilot burner 20 and is operated at full capacity which occurs with gas supplied proportionately by the opening of the two valve members 62, 78. In this manner, the two parallel feed paths provide a full or maximum heating rate at the burner 16 as soon as the same is turned "on" and a temperature setting of the control knob 56 is made.

The heat from the burner 16 acts upon the utensil 12 and its contents in the usual manner. As will be apparent, the temperature of the cooking vessel 12 as sensed by the bulb 15 located within the sensing element 14 rises causing expansion of the power element 100. Expansion of the power element 100 will move the thrust button 102 into engagement with the main actuating lever 108 to gradually swing the same in a clockwise direction. As the lever 108 rotates, the same is followed by the pin 63 thus allowing the valve member 62 to slowly seat upon its seat 64 under the bias of the spring 66. Accordingly, fuel is still being supplied to the burner 16 through the opening 76 and the gradually closing opening 60. In this manner, the height of the flame at the burner 16 slowly decreases until the power element 100 has expanded sufficiently to allow the valve member 62 to close entirely permitting fuel to reach the burner 16 solely under action of the valve member 78. It is to be noted that the closing of the valve member 62 has occurred before the snap-action movement of the snap-action mechanism.

As the temperature of the vessel 12 rises as a result of the slower rate of input to the burner 16 through the opening 76, the power element 100 continues to expand. When the desired temperature of the utensil 12, as previously set by the knob 56, is reached, the power element 100 will have expanded sufficiently to move the main actuating lever 108 beyond its snap-action point such that the lever 114 will have moved from the dotted position to the original or full-line position shown in the drawing so as to permit the valve member 78 to seat upon its seat 80. This action shuts off all fuel supply to the burner 16 and further heating of the utensil 12 is temporarily prevented. It will be apparent that if the temperature of the utensil 12 remains at or above the desired or set temperature, the power element 100 will remain sufficiently expanded to maintain the control lever 114 in the full-line position shown in the drawing thereby insuring the seating of the valve member 78 upon its seat 80. As the temperature of the vessel 12, as sensed by the bulb 15, drops, the power element 100 will contract to permit the control lever 108 to move in a counterclockwise direction and move the control lever 114 in a clockwise direction to open the valve member 78 to again supply fuel to the burner 16 at a reduced rate. The burner 16 will thus be cycled by the repeated movement of the control lever 114 as the power element 100 expands and contracts in response to actual temperature of the vessel 12 with respect to the desired set temperature.

If the temperature of the utensil 12 drops sufficiently below the desired set temperature, or in the event that the reduced heat input is not sufficient to restore the desired temperature, the power element 100 will contract further to permit the movement of the pin 63 to the right by the counterclockwise movement of the main actuating lever 108. This movement once again moves the valve member 62 off its seat 64 to provide a continuous supply of fuel to the burner 16. In this event, both fuel paths through the valve casing 32 are effective as both valve members 62, 78 are in their open positions permitting fuel to be supplied at the burner 16 at a maximum rate.

From the foregoing it will be apparent that the improved thermostatic control device for controlling the flow of fuel to a surface gas burner is such as to be most economical for fuel consumption as well as in construction and maintenance. The disclosed system is controlled by a snap-throttle action rather than a by-pass throttling valve, thus the system is effective for thermostatically controlling a surface burner where fuel is consumed and heat supplied only as required.

While only one embodiment of the invention has been herein shown and described, it will be obvious to those skilled in the art that the invention may be variously embodied and that changes may be made in the construction and arrangement of parts without departing from the scope of the invention as defined in the appended claim.

I claim:

Control apparatus for a gaseous fuel burner having a source of fuel supply, comprising a housing having one wall provided with an inlet for fuel, a passageway in said wall communicating with said inlet and having a pair of valve chambers at opposite ends thereof respectively, a pair of valve ports in one wall for connecting the interior of said housing with said valve chambers respectively, an outlet for fuel in another wall of said housing and communicating with said interior, a pair of valve members operable between controlling positions in said chambers and cooperable with said one wall for controlling flow of fuel through said ports respectively, said valve members being biased to a flow preventing position, valve operating means positioned in said housing and including a pair of operating levers and a spring connecting said levers, one of said levers operatively engaging one of said valve members for snap operation thereof between said positions, the other said lever operatively engaging the other said valve member for gradual operation thereof between said positions, means responsive to a temperature condition caused by operation of the burner and including an actuating element operatively associated with said valve operating means for causing operation of said valve members between said controlling positions, a shut-off valve extending through an opening in said wall between the opposite ends thereof and being operably interposed between said inlet and said passageway, manually adjustable means operatively connected to said shut-off valve and having a stem element operatively connected to said actuating element whereby operation of said manually adjustable means effects operation of said shut-off valve and effects movement of said actuating element for adjusting the relationship between said actuating element and said other lever, and a ported valve member extending through another opening in said wall between one end thereof and the opening for said shut-off valve and being operably disposed in said passageway for selectively adjusting the flow of fuel to one of said valve chambers.

References Cited in the file of this patent

UNITED STATES PATENTS

| | | |
|---|---|---|
| 947,914 | Junkers | Feb. 1, 1910 |
| 2,004,597 | Birtch | June 11, 1935 |
| 2,121,977 | Newell | June 28, 1938 |
| 2,228,198 | Cerny | Jan. 7, 1941 |
| 2,387,164 | McCarty | Oct. 16, 1945 |
| 2,456,864 | Cole | Dec. 21, 1948 |
| 2,500,061 | Clark | Mar. 7, 1950 |
| 2,509,679 | Evans | May 30, 1950 |
| 2,702,052 | Grayson | Feb. 15, 1955 |